Dec. 5, 1933.  G. ORNSTEIN  1,937,780
PROCESS FOR THE DESTRUCTION OF ALGÆ
Filed Dec. 5, 1929  2 Sheets-Sheet 1
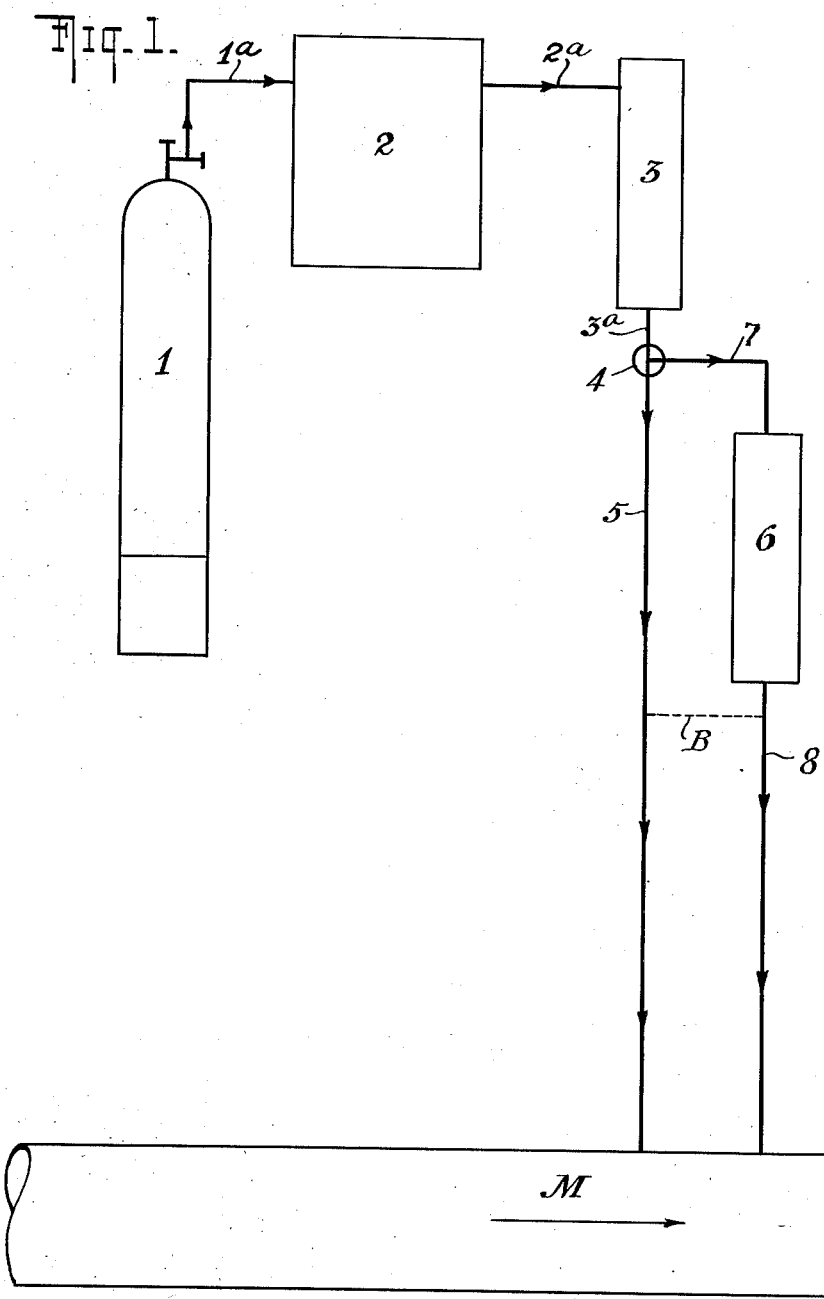

Dec. 5, 1933.  G. ORNSTEIN  1,937,780
PROCESS FOR THE DESTRUCTION OF ALGÆ
Filed Dec. 5, 1929  2 Sheets-Sheet 2
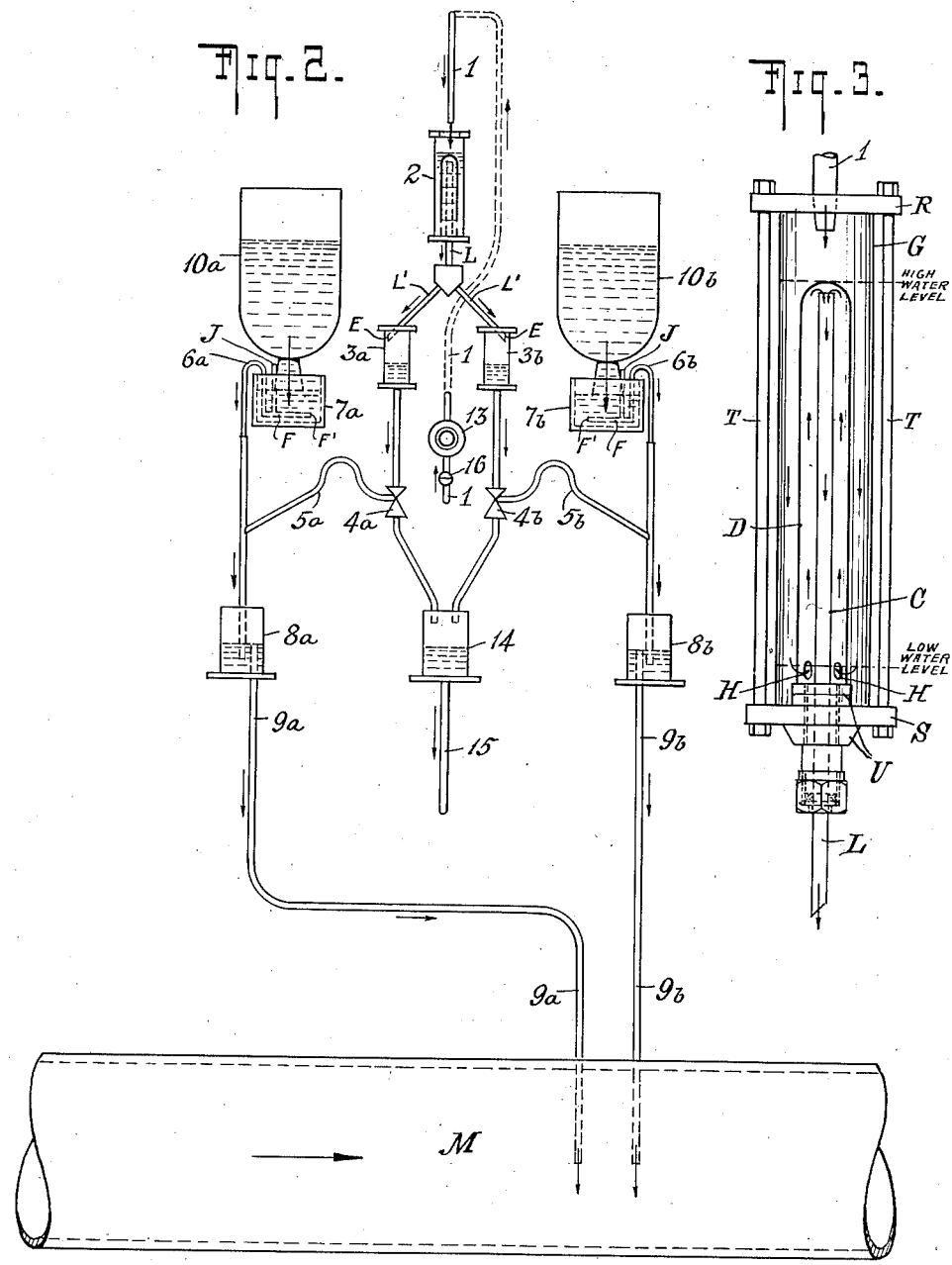
WITNESS
INVENTOR
GEORG ORNSTEIN
BY
ATTORNEYS Patented Dec. 5, 1933

1,937,780

UNITED STATES PATENT OFFICE 1,937,780

PROCESS FOR DESTRUCTION OF ALGÆ

Georg Ornstein, Berlin, Germany

Application December 5, 1929, Serial No. 411,805, and in Germany December 14, 1928

14 Claims. (Cl. 210—28)

The present invention relates to the treatment of water and more particularly to a process of destroying organic growths of the algæ and fungi types contained in water and to apparatus for carrying such process into practice.

It is well known that the destruction of organic growths, such as algæ and fungi, represents an important problem in the art of water and sewage purification. Organic growths of the aforesaid types, when present in water, are frequently the cause of a variety of difficulties. For instance, in swimming pools these growths tend to give the water an unattractive and dirty appearance. In drinking water the presence of these growths imparts disagreeable odors. Industrial plants have also encountered difficulties due to the presence of algæ and fungi in their factory water. Steam-condensing apparatus in factories, power houses, or the like, have experienced obstructions and logging of pipe lines, resulting from these growths and have had their cooling efficiency reduced thereby. In filter plants, the aforesaid organic growths tend to clog the filters and necessitate frequent flushing for their removal. Industrial effluents from pulp-mills, sugar mills and the like have been discharged into streams and have caused the formation of heavy fungoid growths in such streams. These heavy growths tend to impede fishing and to interfere with the use of the water in hydro-electric power stations and water-driven mills. A number of other difficulties furthermore are due primarily to the presence in the water of the algæ and fungi above mentioned.

It has heretofore been proposed for combating organic growths to treat the water with free chlorine or with chlorine-containing solutions, or with copper sulfate. Either of these treatments was attended only with a limited degree of success and then only where the situation was merely a moderate case of algæ control. In more difficult cases, however, especially cases such as are represented by the later instances above cited, neither of the aforementioned treatments proved effective or efficient. Even in the treatment of the more moderate cases, the quantities of either chlorine or of copper sulfate were so high that they caused the occurrence of disagreeable features. For example, in the case of chlorine a distasteful odor of chlorine was imparted to water when used for drinking or swimming or, in the case of copper sulfate, a permanent, excessive amount of copper remained in the water.

It is an object of my invention to provide a process which not only thoroughly and effectively clarifies water with respect to algæ and fungi but which at the same time avoids the disadvantages noted hereinabove in connection with prior processes.

A further object of my invention is to provide a water treatment system which is simple in practice and efficient in establishing an effective control over organic growths of the algæ or fungi type in water, irrespective of their number or bulk.

Other objects will become apparent from the following description, taken in conjunction with the accompanying drawings, in which Fig. 1 depicts, somewhat diagrammatically, a system for carrying my invention into practice; Fig. 2 is a modification of the system shown in Fig. 1, and Fig. 3 is a detail enlarged view of vessel 2 of Fig. 2.

The invention is based upon my discovery that when water is subjected to the joint action of chlorine (either in free form or in available combinations) and also, simultaneously, of copper, a special effect or action is realized which cannot be obtained either by chlorination or by dissolved copper alone, even when used in much larger quantities than would be appropriate for either of these two substances. Although this peculiar action and effect would not therefore be anticipated from à priori considerations, I have demonstrated by the actual application and practical use of my discovery that the simultaneous action of chlorine and of dissolved copper on water not only, as stated, gives considerably higher efficiencies than either chlorine or copper when used singly or separately, but that by such conjoint use an actually effective, reliable and efficient control, not hitherto obtainable by any known or suggested process, over water containing growths of the algæ or fungi types, may be obtained.

Generally speaking, my invention contemplates adding chlorine and copper separately to the water, but under such conditions that the water will be subjected to the simultaneous action of the said two substances immediately after they have been added. A satisfactory manner of carrying the invention into practice is to dissolve the substances in separate streams of water and then to introduce these two separate streams into the body of water to be treated in proximity to each other so as to permit the simultaneous action of the two substances on the water under treatment.

To indicate the superiority of my process over prior processes, the following instance may be mentioned. In a water which had a chlorine consumption of about 20 parts per million and which despite this exceptionally high pollution had to be employed for manufacturing purposes in a paper mill, the algæ were destroyed by the application of my discovery by the joint use of approximately 2.5 parts per million of chlorine and 0.18 parts per million of dissolved copper while all former endeavors of removing the algæ had failed.

In another instance, the treatment of a stream polluted with a fungoid growth of sphærotilus and leptomitus fungi was successfully effected and the growth destroyed by applying jointly 1 part per million of chlorine and 0.1 part per million of dissolved copper. After the destruction of the aforesaid growth in this way the stream was thereafter keep free thereof by treating the water with the approximately one-third to one-half of the aforementioned quantities conjointly applied.

Various ways are available for carrying my procedure into practice but the following are two examples of practical types of apparatus satisfactory for conducting my process on a commercial and industrial scale.

Referring more particularly to Fig. 1, the reference character 1 designates a container for gaseous and/or liquid chlorine. The gas current issuing from container 1 is controlled and measured by an apparatus 2 of well known construction. After leaving apparatus 2, the gas stream is converted into chlorine solution in an absorption jar or tower 3.

A discharge line 3a conducts the water from jar 3 to a regulating and distributing device 4 which controls the amount of chlorinated water going directly to the main pipe line M via pipe line 5 and the amount of chlorinated water flowing to vessel 6 via pipe line 7. Vessel 6 is filled with metallic copper or copper-containing metals or equivalent metals in comminuted form for dissolution by the chlorinated water. Discharge line 8 conducts the water from vessel 6 to main line M. Of course, regulating device 4 permits a control of the distribution of chlorine solution in any desired or pre-determined ratio between pipe lines 5 and 7. In this manner, the amount of dissolved copper produced in vessel 6 by the action of the chlorinated water on the metallic copper and added to the stream of water under treatment can be controlled. Accordingly, the amount of chlorinated water flowing to main line M via line 5 and the amount of water containing dissolved copper flowing to main line M via line 8 can be regulated to suit particular conditions.

The terminals of pipe lines 5 and 8 enter the main pipe line M in close proximity to each other. The water in the main pipe line is thus subjected to the simultaneous action of chlorine-containing water coming from pipe 5 and dissolved copper coming from pipe 8. Under these conditions water flowing in a pipe can be subjected to the joint treatment of chlorine and dissolved copper and can receive the benefits flowing from the use of my invention.

The particular arrangement which involves the use of two separate pipe lines 5 and 8 for the respective solutions is of advantage when for example the water to be treated contains hydrogen sulfide. In that case, if the chlorine is added first, and the copper afterwards, the hydrogen sulfide is destroyed by the chlorine and is thus prevented from precipitating the copper dissolved in the form of copper sulfide as might otherwise be the case with a consequent loss of efficiency. In other cases, however, it is in many instances unnecessary to have two separate lines 5 and 8 and it suffices to use a single line within which the two solutions may be thoroughly mixed before reaching the main M part. In that case, as indicated by the dotted line marked B in Fig. 1, the line 8 is dispensed with and the copper, together with the chlorine, both enter the main M through line 5, an arrangement by which, without loss of efficiency, the advantage of requiring but one pipe line instead of two is afforded.

If "available chlorine" is applied to the water in the form of free hypochlorous acid or hypochlorite solution instead of chlorine gas, a solution of this kind, for instance sodium hypochlorite solution, may be added in selected quantities to the water or sewage to be treated by means of an appropriate, adjustable dosing apparatus. Simultaneously with the addition of the hypochlorite solution, a solution containing a copper salt, for instance copper chloride, may also be added in selected quantities by an adjustable apparatus. It will be of advantage to keep the two solutions separate and only effect the commingling of them in the medium to be treated because undesirable intermediate reactions might take place at higher concentrations existing in the said solutions.

For simplifying the practical application of this process, a dosing apparatus may be employed to advantage, with which both liquids, namely the copper and the chlorine solution may be regulated simultaneously by only one regulating device, so that upon changing the adjustment of the latter, the rate of flow of both solutions will be changed proportionally at the same time in an automatic manner.

An apparatus for carrying out the aforesaid modified method is illustrated in Fig. 2. This apparatus consists of a water pipe line 1, a receiving vessel 2 containing a siphon which is shown in detail in Fig. 3, and a discharge line L which has two branches. As these branches are about equal, and are open to the atmosphere at their ends E, the water flowing therefrom will be approximately equal. The construction of vessel 2 is shown in detail in Fig. 3. Water pipe line 1 projects through a top ring R into a large glass tube G. This tube is mounted in a well known manner between said top ring R and a bottom ring S which are held tightly together by suitable means, such as a plurality of bolts T. Within tube G, a stand pipe C made of glass or the like extends upwardly from bottom ring S. A stuffing box V of appropriate type is utilized to provide a water-tight joint between ring S and stand pipe C and discharge line L. Mounted over stand pipe C is a bell-shaped tube D which is provided with a plurality of inlet holes H at the lower end thereof but above the upper face of ring S. The bottom of tube D is likewise secured in the stuffing box.

The incoming water which flows from inlet line 1 gradually fills up vessel 2 to the top of the bell-shaped tube D. The water flows through holes H and into the space between the inside of bell-shaped tube D and the outside of stand pipe C. Due to the fact that air can freely escape through the stand pipe C through discharge line L and through the associated branch lines L', the water continues to rise within tube D until the water level reaches the top of stand pipe C, whereupon the water begins to flow into stand pipe C. This action causes tube G to be emptied by a siphoning action until the water level in tube G descends to the level of holes H. When the upper part of holes H become exposed, air enters and breaks the siphon which was formed by the action of the several tubes when filled with water.

Incoming water, which flows continually into tube G from pipe 1 then refills the tubes within vessel 2 as above described, until the water again reaches the top of stand pipe C when the siphon discharges again. The rate of flow of the incoming water is, of course, less than the rate at which the water is discharged through stand pipe C during the active period of its siphoning activity.

Two receiving vessels 3a and 3b and associated injectors 4a and 4b are connected with the branches of discharge line L. Pipes 5a and 5b connect injectors 4a and 4b respectively with dosing siphons 6a and 6b which are used for drawing from the storage vessels 7a and 7b desired quantities of their respective solutions. These dosing siphons 6a and 6b are modified siphons in that they consist of the usual inverted U-tube, the end of the inner leg of which is extended into a horizontal branch F with an open ended, submerged, orifice F'. A substantially vertical air tube J projects upwardly from branch E into the atmosphere above vessels 7a or 7b. Supply bottles 10a and 10b are inverted over vessels 7a and 7b respectively and alongside of air tubes E for maintaining a definite liquid level therein. From vessels 7a and 7b, dosing siphons 6a and 6b conduct the respective solutions to receiving vessels 8a and 8b. These vessels are connected by their discharge lines 9a and 9b to the water to be treated which, for example, is flowing in the main M.

In the operation of the aforesaid apparatus, the dosing action takes place in the following manner. A current of water, the rate of which can be adjusted by means of regulating valve 13 in pipe line 1, flows through pipe 1 to the siphon vessel 2. A strainer 16 in pipe line 1 prevents dirt from getting into the line. According to the rate of flow of the water, the siphon vessel 2 is filled at various time intervals and correspondingly discharges with varying frequency within a certain time unit. The outflowing water after discharge from vessel 2, flows at about equal rates into the vessels 3a and 3b and through injectors 4a and 4b. In flowing through the injectors 4a and 4b the water causes a suction in the pipes 5a and 5b which suction, on account of the discharge pipes in vessels 8a and 8b having a liquid seal, is transmitted to the two siphons 6a and 6b, thus causing these siphons to discharge. The leg of siphons 6a, 6b, which is within vessels 7a, 7b, respectively, is normally filled with solution to a level corresponding to the one in vessel 7a or 7b. The suction created by injectors 4a, 4b, causes the solution located within the inner legs to flow over the U-bend of 6a and 6b and to initiate a siphon discharge. Ordinarily the suction only lasts for a period of time sufficient to effect the flow of water through the siphon which, in practice, will be about 3 to 4 seconds.

As soon as the contents of the siphons have been discharged, air enters through the air tube J and breaks the siphons. The inner legs of the two siphons have small openings F at their lowest points which are immersed in the storage vessels 7a and 7b through which they fill again within the time elapsing between two discharges of the siphon. This may be effected by dimensioning the submerged orifices as to fill the inner siphon legs to the original level before the next discharge occurs, due to the renewed aspirating action of injectors 4a and 4b. Accordingly the liquid level in the vessels 7a and 7b is slightly reduced until the lower openings of the liquid level bottles 10a and 10b are exposed to the air whereupon air enters into them and fresh liquid flows into the storage vessels 7a and 7b until the openings of the bottles are again covered by the liquid.

From the discharge vessels 8a and 8b both liquids flow into the water to be treated through the pipe lines 9a and 9b, while the feed water coming from line 1, after passing siphon vessel 2 and the injectors 4a and 4b, is discharged into the vessel 14 and the line 15 connected therewith in any suitable manner. For instance, line 15 may lead into the main pipe line M.

The copper used in the process described in this application will usually be employed in the dissolved form, but I intend to include within the scope of my invention any such process as would be involved if metallic copper were placed within or introduced into the main M in such a manner as to permit an intermediate action between the chlorine and the copper with the consequent formation of copper chloride.

During the course of my experiments in connection with my new process, I have also discovered that in place of copper, other metals or mixtures of metals may be used. Thus copper alloys such as brass or bronze and other alloys of copper can be employed with good results and this is also true with respect to a mixture of silver with copper or even silver alone. If silver and copper, for example, are used, the vessel 6 of Fig. 1 is filled partly with silver and partly with copper in the form of wires, turnings, or borings. Metals such as copper, silver, or the like, when used alone, seem to exert an action which is destructive not only of algæ, but quite generally of micro-organisms such for example as pathogenic bacteria. Just as the algæ-destructive effect is materially intensified when the metals are used conjointly with chlorine, so also the destructive effect on bacteria is intensified by such conjoint use of the metal and the chlorine.

In the claims the references to "copper containing substances," "metallic copper," "dissolved copper," "copper solution," or similar expressions are intended to include equivalents of copper when such equivalents of copper, that is metals or mixtures of metals or alloys have an action, similar to that of copper, of effectively destroying, in conjunction with chlorine treatment, algæ, fungi, bacteria, and other organisms found in water, sewage, and the like.

I claim:

1. The process of treatment of water or sewage for the destruction of micro-organisms such as algæ, bacteria, or the like, which comprises subjecting the liquid requiring the treatment to the joint action of copper-containing substance and dissolved chlorine.

2. The process of treatment of water or sewage for the destruction of micro-organisms such as algæ, bacteria, or the like, which comprises subjecting the liquid requiring the treatment to the joint action of copper-containing substance and another algæ-destructive metal and dissolved chlorine.

3. The process of treating water or sewage fo the destruction of organic growths of the algæ and fungi type which consists in providing for the joint action, on the liquid under treatment, of dissolved chlorine and of copper by the substantially simultaneous introduction of said two reagents to the liquid to be purified.

4. The process of treating water or sewage for the destruction of organic growths of the algæ and fungi type which comprises introducing dissolved chlorine and dissolved copper separately but in proximity to each other into water or sewage to be treated.

5. The process of treating water and sewage for the destruction of organic growths of the algæ and fungi type which comprises preparing a chlorine-containing stream of water, dividing said stream into two smaller streams of predetermined proportions, conducting one of said streams directly to water or sewage to be treated, passing said second stream into contact with metallic copper, and then introducing said copper-contacted stream to the water or sewage to be treated conjointly with or in proximity to the point of introduction of the chlorine-containing stream.

6. The process such as set forth in claim 5 in which the chlorine-containing stream is divided into two equal portions.

7. The process of treating water and sewage for the destruction of organic growths of the algæ and fungi type which comprises preparing a supply of water containing free or available chlorine, introducing said water in regulated amounts into the liquid to be purified, preparing a copper solution, introducing said copper solution in regulated amount to the liquid to be purified and causing the said introduction of said two reagents to be effected substantially simultaneously.

8. A process such as set forth in claim 7, in which the simultaneous introduction of the two reagents is effected at separate but closely adjacent parts of the stream of liquid under treatment.

9. A process such as set forth in claim 7 in which the simultaneous introduction of the two reagents is effected at separate but closely adjacent parts of the liquid under treatment and the chlorine enters the stream of liquid under treatment in advance of the copper.

10. The process of treating water or sewage for the destruction of organic growths of the algæ and fungi type which comprises introducing into water or sewage to be treated dissolved chlorine and dissolved copper, separately, but in such proximity to each other that at the point where the second of the two chemical agents is added, there will still be contained in the liquid under treatment at least a part of the first added chemical agent in a state where it has not been spent by previous reaction with the contents of the said liquid.

11. The process of treating water and sewage for the destruction of organic growths of the algæ and fungi type which comprises preparing a chlorine-containing stream of water, dividing said stream in to two smaller streams of predetermined proportions, conducting one of said streams directly to water or sewage to be treated, passing said second stream into contact with metallic copper, and then introducing said copper-contacted stream to the water or sewage to be treated conjointly with or in such proximity to the point of introduction of the chlorine-containing stream that at the point where the second of the two named chemical agents is added, there will still be contained in the liquid under treatment at least a part of the first added chemical agent in a state where it has not been spent by previous reaction with the contents of the said liquid.

12. The process of treating water and sewage for the destruction of organic growths of the algæ and fungi type which comprises preparing a supply of water containing free or available chlorine, introducing said water in regulated amounts into the liquid to be purified, preparing a copper solution, introducing said copper solution in regulated amount to the liquid to be purified and causing the said introduction of said two reagents to be so effected as to cause the liquid to be affected for the destruction of the said type of organic growths and to be subjected to the joint action of the two reagents.

13. A process such as set forth in claim 12 in which the simultaneous introduction of the two reagents is effected at separate but so closely adjacent parts of the stream of liquid under treatment that said stream will be affected by the joint action of the two reagents.

14. A process such as set forth in claim 12 in which the chlorine solution enters the stream of liquid under treatment in advance of the copper solution and the simultaneous introduction of the two reagents is effected at separate but so closely adjacent parts of the stream of liquid under treatment that said stream will be affected by the joint action of the two reagents.

GEORG ORNSTEIN.